UNITED STATES PATENT OFFICE 2,438,704

ORGANIC COMPOUNDS SERVING AS CYANINE DYESTUFF INTERMEDIATES

John David Kendall, Henry Walter Wood, and John Raymond Majer, Ilford, England, assignors to Ilford Limited, Ilford, Essex, England, a British company No Drawing. Application October 8, 1942, Serial No. 461,323. In Great Britain November 6, 1941

16 Claims. (Cl. 260—240)

This invention relates to the production of new organic compounds which are of value as intermediates in the manufacture of dyestuffs.

Processes are already known for the manufacture of organic compounds of the general Formula I:

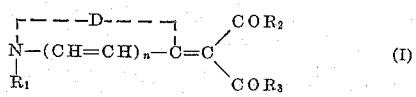

where D is the residue of a heterocyclic nitrogen nucleus, $R_1$ is an alkyl or aralkyl group, $R_2$ and $R_3$ are hydrocarbon groups, e. g. alkyl, aryl or aralkyl groups, and $n$ is nought or 1. Such compounds may be prepared by reacting an alkyl or aralkyl quaternary salt of a heterocyclic nitrogen compound containing an alkyl-thio group in the $\alpha$ or $\gamma$ position to the heterocyclic nitrogen atom with a 1.3-diketone of the general Formula II:

in the presence of an acid binding agent.

Processes have also been described for converting compounds of the type of

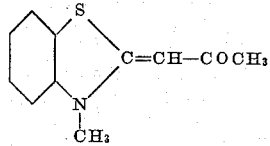

to the corresponding thio compounds of the type

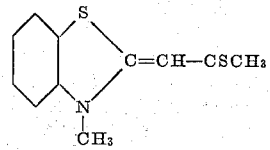

These processes consist in directly heating the former compound with phosphorus pentasulphide or treating the former compound with phosphorus pentachloride and then with thioacetamide. It has been found that neither of these processes is effective in converting compounds of general Formula I to the corresponding thione compounds.

It has now been discovered, however, and this forms the basis of the present invention, that compounds of general Formula I may be readily converted to corresponding compounds containing reactive thioether groups by treating with an alkyl- or aralkyl-mercaptan in the presence of a strong acid. The reaction may be effected in the presence of a solvent for the reactants; however, if a hydroxylic solvent is employed there results some hydrolysis of the compounds of general Formula I to the corresponding monoacylated compounds. In order to reduce as much as possible this tendency to hydrolysis, the reagents are preferably used as dry as possible. A very convenient acid to use is dry hydrochloric acid gas. Any excess of this remaining at the end of the reaction is capable of removal under reduced pressure.

The course of the reaction is believed to be as follows. In these formulae A is an acid radicle, $R_4$ is an alkyl or aralkyl group and the other symbols have the meanings assigned to them above:

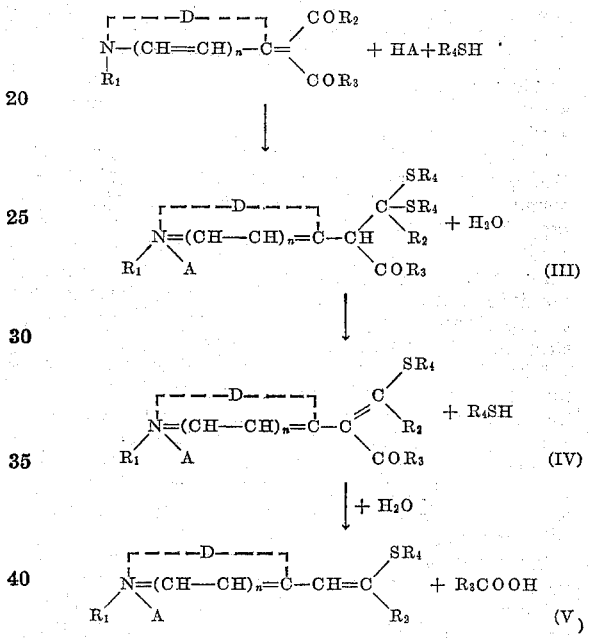

The applicants consider their new intermediates to have the general Formula V. It is clear that the reaction does not depend on an initial hydrolysis of the compound of general Formula I to the mono-acylated compound from the fact that treatment of the mono-acylated compound with an alkyl mercaptan and an acid does not produce the thio compound, the original material being obtained unchanged.

The new intermediates of general Formula V may readily be isolated from any acylated products produced by hydrolysis of the compounds of general Formula I since the new intermediates are more soluble in ethyl and methyl alcohol. The new intermediates are quite stable in such alcoholic solution and evaporation of the alcohol under reduced pressure yields the intermediates in solid form.

Referring to the formulae set forth above, the residue D may be the residue of any heterocyclic nitrogen compound, e. g. the residue of any of the heterocyclic nitrogen compounds commonly employed in the manufacture of cyanine dyestuffs such as the substituted and unsubstituted thiazoles, thiazolines, oxazoles, oxazolines, selenazoles, selenazolines, pyridine, quinoline, indolenine, diazines (e. g. pyrimidine) thio-diazoles and quinazoline and the corresponding substituted or unsubstituted polycyclic compounds such as benzthiazoles, naphthathiazoles and anthrathiazoles and also the diazines described in specification No. 425,609, now Patent No. 2,366,222.

The groups $R_1$, $R_2$, $R_3$ and $R_4$ may variously be hydrogen atoms, alkyl, aryl or aralkyl groups as above defined. $R_1$ is preferably a lower alkyl group, i. e. a methyl, ethyl, propyl or butyl group or, if an aralkyl group, is preferably a benzyl group. $R_2$ and $R_3$ are preferably lower alkyl groups but they may be higher alkyl groups or aralkyl groups or aryl groups. The group $R_4$ is preferably a lower alkyl group since the lower alkyl mercaptans are more easily reactive in the process of this invention, though it may be an aralkyl group. Any of the aforesaid alkyl, aryl or aralkyl groups may themselves contain substituent groups, e. g. hydroxy or amino groups.

As indicated above, dry hydrochloric acid gas is a very convenient acid to employ in the process of this invention. However, other strong acids may be employed, e. g. other hydrohalic acids, nitric acid, sulphuric acid, or phosphoric acid, or strong organic acids, e. g. p-toluene sulphonic acid.

The intermediates obtained by the process of the present invention are in the form of quaternary salts and it is to be understood that they may be converted to quaternary salts of other acids by treatment with suitable salts of such other acids, e. g. alkali metal salts. Thus intermediates obtained as chlorides may be converted to bromides or iodides by treatment with potassium bromide or potassium iodide.

The dyestuff intermediates of this invention may be employed for the formation of dyestuffs by condensing them with quaternary salts of heterocyclic nitrogen compounds of the type used in cyanine dyes (e. g. any of the heterocyclic nuclei hereinbefore mentioned) containing in the $\alpha$ or $\gamma$ position to the heterocyclic quaternary nitrogen atom a reactive methyl group, monosubstituted methyl group or external methylene group or by condensing them with heterocyclic nitrogen keto-methylene compounds (e. g. rhodanic acid, hydantoin, pyrazole-5-ones and oxindoles) or other cyclic keto-methylene compounds.

The following examples illustrate the invention:

*Example 1*

Preparation of the dyestuff intermediate of the probable formula:

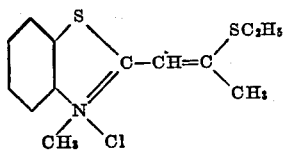

22.5 gms. of 1-(diacetyl-methylene)-2-methyl-dihydro-benzthiazole, 50 ccs. of methyl alcohol and 14 ccs. of ethyl mercaptan were mixed together and a stream of dry hydrochloric acid gas was passed through the mixture. The solid material in suspension slowly dissolved and when solution was completed, a further 14 ccs. of ethyl mercaptan was added and the solution was saturated with dry hydrochloric acid gas.

The mixture was then allowed to stand for four days whereupon a yellow solid was precipitated out. This was filtered off and consisted of the hydrochloride of 1-(acetyl-methylene)-2-methyl-dihydrobenzthiazole. The filtrate was evaporated to dryness under reduced pressure and yielded the desired dyestuff intermediate as a yellow solid. It had a melting point of 175° C.

*Example 2*

Preparation of the dyestuff intermediate of the probable formula:

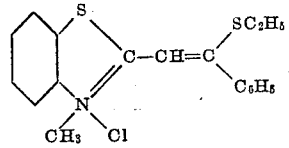

14.7 gms. of 1(benzoyl-acetyl-methylene)-2-methyl-dihydro-benzthiazole, 50 ccs. of methyl alcohol and 20 ccs. of ethyl mercaptan were mixed together and dry hydrochloric acid gas was passed through the mixture. The suspended solid matter slowly dissolved. After about one hour a yellow solid was precipitated and this consisted of the hydrochloride of 1-(benzoyl-methylene)-2-methyl-dihydro-benzthiazole formed by partial hydrolysis of the original benzthiazole compound. It was separated by filtration and the filtrate was evaporated to dryness under reduced pressure. The solid residue was triturated with a little methyl alcohol and then filtered. On evaporation of the methyl alcohol from the filtrate the desired dyestuff intermediate was obtained as an orange yellow solid melting at 180° C.

*Example 3*

Preparation of the dyestuff intermediate of the probable formula:

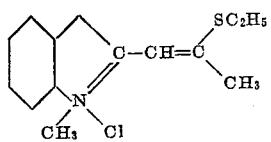

9 gms. of 1-methyl-2-(diacetyl-methylene)-1:2-dihydro quinoline and 50 ccs. of ethyl mercaptan were mixed together and cooled. 2.7 gms. dry hydrochloric acid gas was then passed through the mixture. An oil separated on standing and this was separated and dried in a vacuum desiccator, yielding the desired dyestuff intermediate as a light brown sticky solid.

*Example 4*

Preparation of the dyestuff intermediate of the probable formula

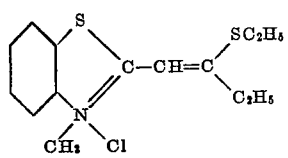

30 gms. of 1-(ω-dipropionyl-methylene)-2-methyl-dihydro-benzthiazole were mixed with 50 ccs. of ethyl mercaptan and 8 gms. of dry hydrochloric acid gas was passed through the mixture. A yellow solid was precipitated. The mixture was allowed to stand for 2 days, filtered and the excess mercaptan removed from the filtrate by distillation, leaving the desired dyestuff intermediate as a yellow oil which solidified to low-melting yellow needles.

*Example 5*

Preparation of the dyestuff intermediate of the probable formula:

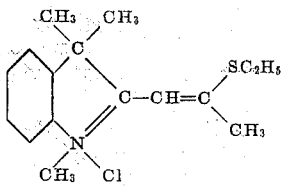

7 gms. of 2-(diacetyl-methylene)-1.3.3.-trimethyl dihydro-indolenine and 25 ccs. of ethyl mercaptan were mixed together and 2 gms. of dry hydrochloric acid gas was passed through the mixture. The mixture was then left to stand. The product separated as an oil, which was dried in a vacuum desiccator.

What we claim is:

1. A process for the production of dyestuff intermediates which comprises reacting a compound of the general formula:

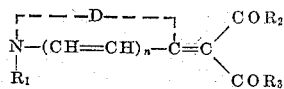

where D is the residue of a heterocyclic nitrogen compound of the type used in cyanine dyes, $R_1$ is selected from the class consisting of alkyl and aralkyl groups, $R_2$ and $R_3$ are hydrocarbon groups, and $n$ is selected from the class consisting of nought and 1 with a substance selected from the class consisting of alkyl and aralkyl mercaptans, in the presence of a strong acid.

2. A process for the production of dyestuff intermediates which comprises reacting a compound of the general formula:

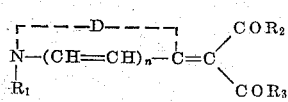

where D is the residue of a heterocyclic nitrogen compound of the type used in cyanine dyes, $R_1$ is selected from the class consitsing of alkyl and aralkyl groups, $R_2$ and $R_3$ are hydrocarbon groups, and $n$ is selected from the class consisting of nought and 1 with a substance selected from the class consisting of alkyl and aralkyl mercaptans, in the presence of a strong mineral acid.

3. A process for the production of dyestuff intermediates which comprises reacting a compound of the general formula:

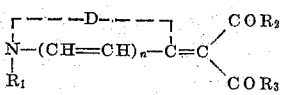

where D is the residue of a heterocyclic nitrogen compound of the type used in cyanine dyes, $R_1$ is selected from the class consisting of alkyl and aralkyl groups, $R_2$ and $R_3$ are hydrocarbon groups, and $n$ is selected from the class consisting of nought and 1 with a substance selected from the class consisting of alkyl and aralkyl mercaptans in the presence of dry hydrochloric acid gas.

4. A process for the production of dyestuff intermediates which comprises reacting a compound of the general formula:

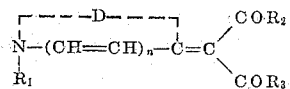

where D is the residue of a heterocyclic nitrogen compound of the type used in cyanine dyes, $R_1$ is selected from the class consisting of alkyl and aralkyl groups, $R_2$ and $R_3$ are hydrocarbon groups, and $n$ is selected from the class consisting of nought and 1 with a lower alkyl mercaptan in the presence of a strong mineral acid.

5. A process for the production of dyestuff intermediates which comprises reacting a compound of the general formula:

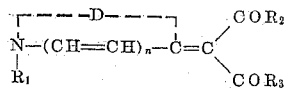

where D is the residue of a heterocyclic nitrogen compound of the type used in cyanine dyes in which the only heterocyclic atoms are nitrogen, $R_1$ is selected from the class consisting of alkyl and aralkyl groups, $R_2$ and $R_3$ are hydrocarbon groups, and $n$ is selected from the class consisting of nought and 1 with a substance selected from the class consisting of alkyl and aralkyl mercaptans in the presence of a strong acid.

6. A process for the production of dyestuff intermediates which comprises reacting a compound of the general formula:

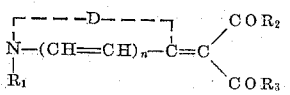

where D is the residue of a heterocyclic nitrogen compound of the type used in cyanine dyes in which the only heterocyclic atoms are nitrogen, $R_1$ is selected from the class consisting of alkyl and aralkyl groups, $R_2$ and $R_3$ are hydrocarbon groups and $n$ is selected from the class consisting of nought and 1 with a substance selected from the class consisting of alkyl and aralkyl mercaptans, in the presence of a strong mineral acid.

7. A process for the production of dyestuff intermediates which comprises reacting a compound of the general formula:

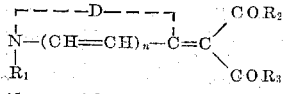

where D is the residue of a heterocyclic nitrogen compound of the type used in cyanine dyes in which the only heterocyclic atoms are nitrogen, $R_1$ is selected from the class consisting of alkyl and aralkyl groups, $R_2$ and $R_3$ are hydrocarbon groups and $n$ is selected from the class consisting of nought and 1 with a substance selected from the class consisting of alkyl and aralkyl mercaptans in the presence of dry hydrochloric acid gas.

8. A process for the production of dyestuff intermediates which comprises reacting a compound of the general formula:

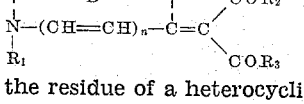

where D is the residue of a heterocyclic nitrogen compound of the type used in cyanine dyes in which the only heterocyclic atoms are nitrogen, $R_1$ is selected from the class consisting of alkyl and aralkyl groups, $R_2$ and $R_3$ are hydrocarbon groups and $n$ is selected from the class consisting of nought and 1 with a lower alkyl mercaptan in the presence of a strong mineral acid.

9. A process for the production of dyestuff intermediates which comprises reacting a compound of the general formula:

$$\begin{array}{c} \text{[- - -D- - -]} \\ \text{N--(CH=CH)}_n\text{--C=C} \\ | \\ R_1 \end{array} \begin{array}{c} \text{CO.Alkyl} \\ \\ \text{CO.Alkyl} \end{array}$$

where D is the residue of a heterocyclic nitrogen compound of the type used in cyanine dyes in which the only heterocyclic atoms are nitrogen, $R_1$ is selected from the class consisting of alkyl and aralkyl groups and $n$ is selected from the class consisting of nought and 1 with a substance selected from the class consisting of alkyl and aralkyl mercaptans in the presence of a strong acid.

10. A process for the production of dyestuff intermediates which comprises reacting a compound of the general formula:

$$\begin{array}{c} \text{[- - -D- - -]} \\ \text{N--(CH=CH)}_n\text{--C=C} \\ | \\ R_1 \end{array} \begin{array}{c} \text{CO.Alkyl} \\ \\ \text{CO.Alkyl} \end{array}$$

where D is the residue of a heterocyclic nitrogen compound of the type used in cyanine dyes in which the only heterocyclic atoms are nitrogen, $R_1$ is selected from the class consisting of alkyl and aralkyl groups and $n$ is selected from the class consisting of nought and 1 with a substance selected from the class consisting of alkyl and aralkyl mercaptans, in the presence of a strong mineral acid.

11. A process for the production of dyestuff intermediates which comprises reacting a compound of the general formula:

$$\begin{array}{c} \text{[- - -D- - -]} \\ \text{N--(CH=CH)}_n\text{--C=C} \\ | \\ R_1 \end{array} \begin{array}{c} \text{CO.Alkyl} \\ \\ \text{CO.Alkyl} \end{array}$$

where D is the residue of a heterocyclic nitrogen compound of the type used in cyanine dyes in which the only heterocyclic atoms are nitrogen, $R_1$ is selected from the class consisting of alkyl and aralkyl groups and $n$ is selected from the class consisting of nought and 1 with a substance selected from the class consisting of alkyl and aralkyl mercaptans in the presence of dry hydrochloric acid gas.

12. A process for the production of dyestuff intermediates which comprises reacting a compound of the general formula:

$$\begin{array}{c} \text{[- - -D- - -]} \\ \text{N--(CH=CH)}_n\text{--C=C} \\ | \\ R_1 \end{array} \begin{array}{c} \text{CO.Alkyl} \\ \\ \text{CO.Alkyl} \end{array}$$

where D is the residue of a heterocyclic nitrogen compound of the type used in cyanine dyes in which the only heterocyclic atoms are nitrogen, $R_1$ is selected from the class consisting of alkyl and aralkyl groups and $n$ is selected from the class consisting of nought and 1 with a lower alkyl mercaptan in the presence of a strong mineral acid.

13. A dyestuff intermediate of the general formula:

[Structure: benzo-fused N-heterocycle with –CH=C(SR$_4$)(R$_2$), N bears R, X]

wherein $R_1$ and $R_4$ are each selected from the class consisting of alkyl and aralkyl groups, $R_2$ is a hydrocarbon group and X is an acid radical and the acyclic carbon atom is attached to a carbon atom of the hetero ring in a position taken from the group consisting of alpha and gamma positions to the nitrogen atom.

14. A dyestuff intermediate of the general formula:

[Structure: benzo-fused N-heterocycle with –CH=C(SR$_4$)(R$_2$), N bears R, X]

wherein $R_1$ is selected from the class consisting of alkyl and aralkyl groups, X is an acid radical and the acyclic carbon atom is attached to a carbon atom of the hetero ring in a position taken from the group consisting of alpha and gamma positions to the nitrogen atom.

15. A dyestuff intermediate of the formula:

[Structure: quinoline ring with –CH=C(SC$_2$H$_5$)(CH$_3$), N–CH$_3$, Cl]

16. A compound of the following formula:

[Structure: benzo-fused N-heterocycle with –CH=C(R$_2$)–SR$_3$, N bears R$_1$, X]

wherein $R_1$ represents alkyl, $R_2$ represents a hydrocarbon group, $R_3$ represents an alkyl group, and X represents an anion and the trivalent acyclic carbon atom is attached to a carbon atom of the hetero ring in a position taken from the group consisting of alpha and gamma positions to the nitrogen atom.

JOHN DAVID KENDALL.
HENRY WALTER WOOD.
JOHN RAYMOND MAJER.

REFERENCES CITED

The following references are of record in the file of this patent:

UNITED STATES PATENTS

| Number | Name | Date |
|---|---|---|
| 2,153,927 | Kendall | Apr. 11, 1939 |
| 2,189,599 | Brooker | Feb. 6, 1940 |
| 2,231,658 | Brooker | Feb. 11, 1941 |
| 2,233,511 | Brooker | Mar. 4, 1941 |
| 2,263,761 | Davey | Nov. 25, 1941 |
| 2,313,922 | Carol | Mar. 16, 1943 |
| 2,316,268 | Mareis | Apr. 13, 1943 |
| 2,355,654 | Kendall | Aug. 15, 1944 |

FOREIGN PATENTS

| Number | Country | Date |
|---|---|---|
| 877,225 | France | Sept. 1, 1942 |

OTHER REFERENCES

Imperial Acad. of Japan (1937–1938), page 262.

Certificate of Correction

Patent No. 2,438,704.  March 30, 1948.

JOHN DAVID KENDALL ET AL.

It is hereby certified that errors appear in the printed specification of the above numbered patent requiring correction as follows: Column 2, lines 16 to 19 inclusive, for that portion of the formula reading

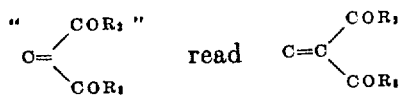

column 4, lines 50 to 55 inclusive, Example 3, for that portion of the formula reading

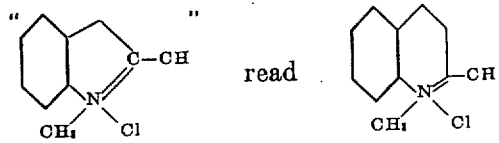

column 5, line 55, for "consitsing" read *consisting*; and that the said Letters Patent should be read with these corrections therein that the same may conform to the record of the case in the Patent Office.

Signed and sealed this 15th day of June, A. D. 1948.

[SEAL]

THOMAS F. MURPHY,
*Assistant Commissioner of Patents.*